United States Patent
Maekawa et al.

[11] 3,908,620
[45] Sept. 30, 1975

[54] INTAKE MANIFOLD

[75] Inventors: Takehiko Maekawa; Masahiko Nakada; Hirofumi Matsumoto, all of Toyota, Japan

[73] Assignee: Toyota Jidosha Kogyo Kabushiki Kaisha, Japan

[22] Filed: June 21, 1973

[21] Appl. No.: 371,998

[30] Foreign Application Priority Data
July 26, 1972   Japan.................................. 47-74128

[52] U.S. Cl........................... 123/122 AB; 123/75 B
[51] Int. Cl....................... F02b 19/10; F02m 31/00
[58] Field of Search... 123/122 A, 122 AB, 122 AC, 123/52 M, 32 SP, 32 ST, 75 B, 127

[56] References Cited
UNITED STATES PATENTS

| | | | |
|---|---|---|---|
| 1,342,159 | 6/1920 | Champaign.................... | 123/122 AB |
| 1,600,007 | 9/1926 | Mock............................ | 123/122 AB |
| 1,705,036 | 3/1929 | Taub............................ | 123/122 AB |
| 1,744,319 | 1/1930 | Link............................. | 123/122 AC |
| 1,777,472 | 10/1930 | Mock............................ | 123/122 AB |
| 2,244,214 | 6/1941 | Pescara......................... | 123/75 B |
| 2,821,182 | 1/1958 | Kennedy....................... | 123/122 A |
| 3,648,674 | 3/1972 | Proctor......................... | 123/122 |
| 3,780,715 | 12/1973 | Flitz............................. | 123/122 AC |

Primary Examiner—Charles J. Myhre
Assistant Examiner—Ronald B. Cox
Attorney, Agent, or Firm—Toren, McGeady and Stanger

[57] ABSTRACT

An intake manifold for an internal combustion engine utilizing a carburetor having dual passages includes a manifold housing which also has dual passages in communication with the carburetor dual passages. One of the passages in the manifold housing is heated in a positive manner to facilitate vaporization of fuel in the heated manifold passage, thereby improving operability of the engine during warm-up and also reducing the noxious components in the exhaust gas.

1 Claim, 2 Drawing Figures

INTAKE MANIFOLD

BACKGROUND OF THE INVENTION

1. Field of the Invention

This invention relates to an intake manifold adapted for use in an automobile, internal combustion, gasoline engine equipped with a double-barrel carburetor, and more particularly to an intake manifold of the type described, which is capable of improving operability of the engine during the period before the engine is completely warmed-up and which is also capable of reducing the noxious components such as carbon monoxide (CO) or unburnt hydrocarbons (HC) in the exhaust gas.

2. Description of the Prior Art

Generally, in the condition where a gasoline internal combustion engine has not yet sufficiently warmed-up, the intake manifold itself remains at a low temperature and hence, the fuel vaporization rate is also low. During such time, the operability of the engine may be impaired if it is subjected to an immoderate or excessive mode of operation such as subjecting the engine to excess acceleration demands or operating the engine in a manner in which distribution of the fuel mixture is improper. Also, the noxious components such as CO or HC in the exhaust gas may be increased if liquid fuel is present in great quantity. However, conventional manifolds have a high heat capacity, thereby making it difficult or hardly possible to shorten or reduce the time to warm-up the manifold. Heretofore, attempts have been made to increase the amount of heat to the intake manifold, but this tends to result in an excessive rise of suction temperature after the engine has been warmed-up and causes a decrease in the amount of air taken in, thereby resulting in reduced engine output.

SUMMARY OF THE INVENTION

The present invention provides an intake manifold which overcomes the aforementioned disadvantages of known prior art arrangements and which is capable of improving the operability of an engine during the warm-up period and of reducing the noxious components in the exhaust gas.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE INVENTION

Figure 1:
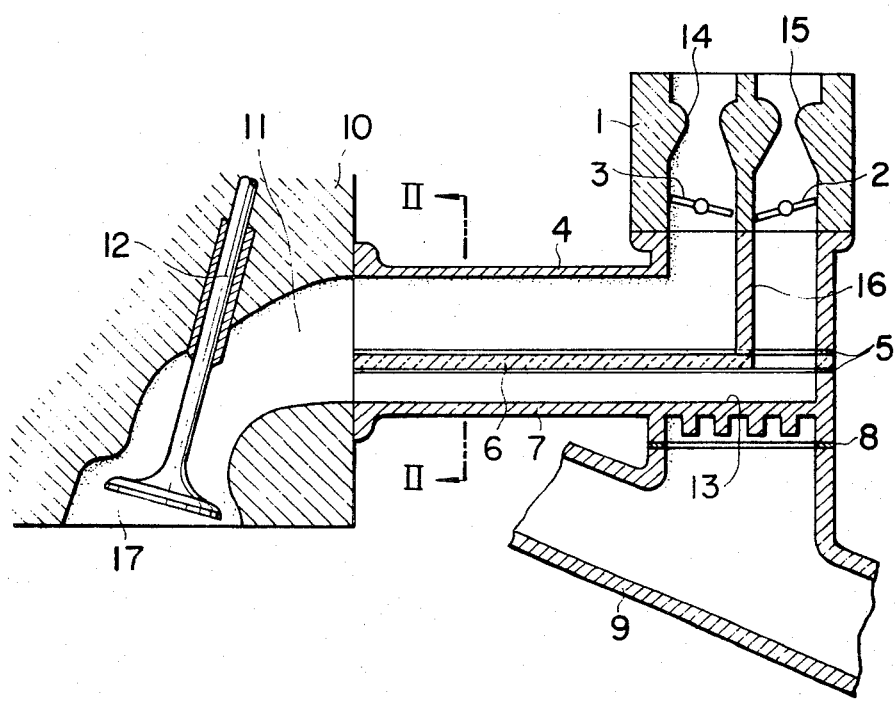
FIG. 1 is a sectional view showing the arrangement and associated elements of an intake manifold according to one embodiment of the present invention.
Figure 2:
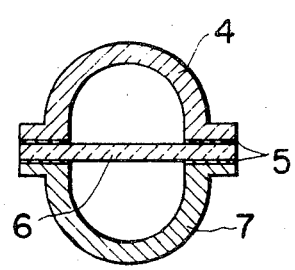
FIG. 2 is a sectional view taken along line II—II of FIG. 1.

Referring to the drawings, FIG. 1 shows a carburetor body 1 and a cylinder head 10 having a combustion chamber 17 formed therein. The carburetor body 1 and combustion chamber 17 are in communication with one another by an intake manifold assembly consisting of an upper intake manifold 4 and a lower intake manifold 7. The interior of the carburetor body 1 is partitioned to define two passages in which a primary side, throttle valve 2 and venturi 15 and a secondary side, throttle valve 3 and venturi 14 are disposed respectively. The intake manifold assembly is also partitioned into a primary side portion and a secondary side portion by a heat insulating plate 6 and a partition plate 16. The heat insulating plate 6 is made of a material having the properties which make it an excellent heat insulator and which provides airtightness. Examples of materials suitable for use as the insulating plate 6 include plastics, particularly Bakelite or synthetic rubber, asbestos, cork, thick paper and the like.

The drawings also show gaskets 5 and 8, an exhaust manifold 9, an intake port 11, and an intake valve 12. At a part of the bottom portion of the lower intake manifold 7 there is provided a heating section 13 for heating the mixture as will be further described. The intake manifold 7 is connected to the exhaust manifold 9 beneath the heating section 13 through the gasket 8.

In the operation of the above-described arrangement, the fuel which has passed the primary side throttle valve 2 impinges against the heating section 13 in the lower intake manifold 7. At the same time, high-temperature exhaust gas discharging through the exhaust manifold 9 passes beneath the heating section 13 in the lower intake manifold 7 to thereby heat the heating section 13. Thus, the fuel which has impinged against the heating section 13 is rapidly vaporized and drawn into the suction port 11. At the same time, the fuel which has passed the secondary side throttle valve 3 impinges directly against the heat insulating plate 6 and is drawn into the suction port 11 without being heated to any appreciable degree.

According to the present invention as set forth above, the following advantages are obtained:

1. Since the inside of the intake manifold is divided into two portions 4 and 7, the intra-tube velocity on the primary valve side can be elevated or increased more than twice that of conventional systems, thereby increasing the effect of blowing off the liquid fuel deposited or accumulated on the inner wall of the manifold before warming-up of the engine. This arrangement promotes atomization of fuel and improves fuel distribution to the respective cylinders, thereby resulting in improved operability of the vehicle and reduced amounts of noxious components such as CO and HC in the exhaust gas.

2. Since the heat capacity of the lower intake manifold 7, to which suction heat is applied, can be lowered more than half as compared to conventional devices, the intake manifold can be heated more quickly to allow shortening of the time required for engine warm-up. Also the heating section 13 can be elevated to a high temperature to promote fuel vaporization, thereby providing a further improvement of vehicle operability and reduction of CO and HC in the exhaust gas.

3. Further, since the suction heat to the secondary valve side is insulated by a heat insulating plate 6, it is possible to prevent a decrease in the air suction rate caused by a rise of suction temperature, thus allowing an increase in the heated area of the lower intake manifold 7 without sacrificing high speed engine output.

It will be seen from the above description that the present invention results in a reduction in the amount of time required for engine warm-up, results in the improvement of the vehicle operability, and provides for the reduction of noxious components such as CO and HC in exhaust gas, all of the above being accomplished without causing any loss of engine output.

While the invention has been described by means of a specific example and in a specific embodiment, it is not intended to be limited thereto, for obvious modifications will occur to those skilled in the art without departing from the spirit and scope of the invention.

What is claimed is:

1. An intake manifold assembly for an internal combustion engine including exhaust gas conduit means and utilizing a carburetor having primary and secondary passage means through which an air-fuel mixture is delivered to said engine, said assembly comprising a housing receiving said air-fuel mixture from said carburetor, means defining said housing with a primary manifold passage in direct flow communication with said carburetor primary passage means and with a secondary manifold passage in direct flow communication with said carburetor secondary passage means, said primary and said secondary manifold passages being defined over at least portions thereof by a pair of sections having a generally concave cross-sectional configuration each including a pair of laterally extending flanges at which said concave sections are joined together, means defining a heating section contiguous to said primary manifold passage, with a wall extending to separate said heating section and said primary manifold passage, said wall defining on one side thereof a portion of the interior of said primary manifold passage and on the opposite side thereof a portion of the interior of said heating section, said wall being formed on said opposite heating section side with a plurality of heat transmission fin members extending into said heating section, means connecting said heating section in flow communication with said exhaust gas conduit means to direct exhaust gases from said engine into said heating section thereby to effect heating of said air-fuel mixture flowing in said primary manifold passage by heat transmission from said exhaust gases, and heat insulation means extending to insulate said primary manifold passage from said secondary manifold passage to block transfer to said secondary manifold passage of the heat transmitted to said primary manifold passage from said exhaust gases, said heat insulation means being mounted between said laterally extending flanges to separate said primary and secondary manifold passages, with gasket means being provided between said flanges and said insulating means, said assembly being configured and arranged with said heating section located on one side of said primary manifold passage and with said secondary manifold passage and said insulation means located on an opposite side thereof remote from said one side.

* * * * *